United States Patent Office 3,118,968
Patented Jan. 21, 1964

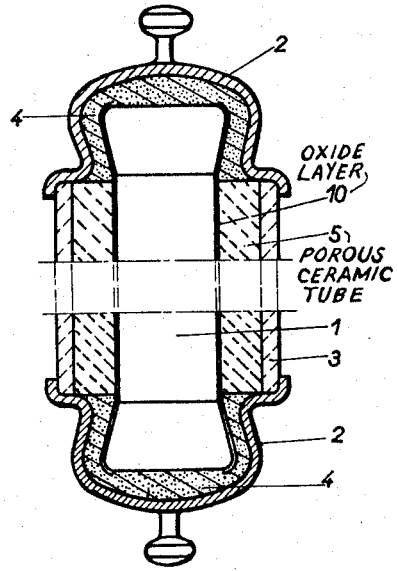
Fig.: 2
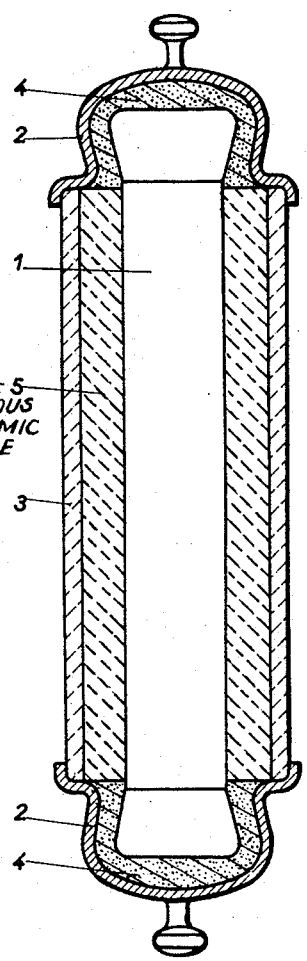
Fig.: 1
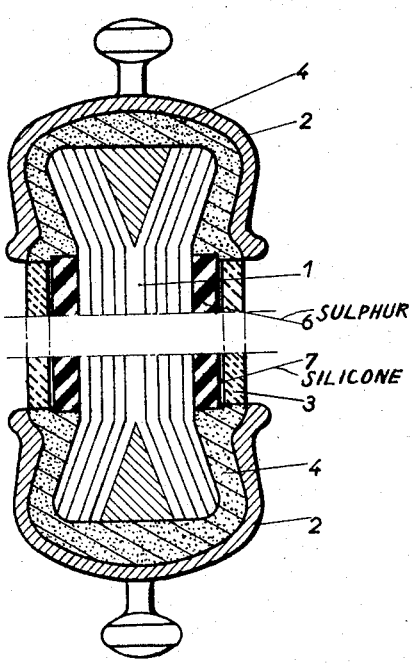
Fig.: 3

3,118,968
TRANSMISSION LINE SUSPENSION INSULATORS
WITH CENTRAL CORES
Jean Moussou, Pouzac Hautes-Pyrenees, France, assignor to Compagnie Generale d'Electro-Ceramique, Paris, France, a company of France
Filed Feb. 15, 1961, Ser. No. 89,443
Claims priority, application France Feb. 19, 1960
11 Claims. (Cl. 174—179)

The present invention relates to an improvement in transmission line suspension insulators consisting basically of a central insulating barrel or core resistant to traction which is connected to two attachment fittings and arranged within a protective envelope generally made of ceramic material which protects the central core against atmospheric effects and also if necessary against arcing effects.

As the result of some mishap on the transmission line, the outer envelope may be damaged by an electric arc, resulting in the central core being laid bare. The invention has for its object to provide this core with means whereby it is able to withstand another electric arc, at least for a limited period of time, even in the absence of the outer protective envelope.

To this end, and in accordance with the invention, there is interposed inside the insulator, between the central core and the envelope, solid insulating means made of mineral material.

In one embodiment, this insulation takes the form of a porous ceramic tube which is itself capable of being impregnated with insulating material introduced into the pores of the ceramic material in liquid form.

In another embodiment, the intermediate solid insulation consists of a mass of sulphur.

The accompanying drawing, given by way of example only and not in a limiting sense, will given a clear understanding of the nature of the invention.

In the drawing, FIGS. 1, 2 and 3 are axial sections of suspension insulators embodying features of three possible embodiments of the invention.

Referring now to FIG. 1, the insulator shown consists chiefly of an insulating bar-shaped core 1 which is resistant to traction and to each end of which is sealed a metal suspension cap 2. An envelope 3 made of some insulating material such as a ceramic surrounds the core 1. Cement 4 is spread within the caps 2 in order to seal them to the core 1. These caps 2 cover and protect the ends of envelope 3.

In accordance with the invention, the annular space between the core 1 and the envelope 3 is occupied by a porous ceramic tube 5 which may be in one piece or may be formed from stacked elements and which is impregnated and rendered integral with core 1 and envelope 3 by a filler and impregnation insulating material such as synthetic resin or melted sulphur, it being clearly understood that the medium used to impregnate the tube 5 and the filler medium used to render the tube 5 integral with the core 1 and the envelope 3 may be of different nature. Thus, for example, it is recommended that the porous tube 5 be impregnated with a resin of the tricyanamide or cyanauramide type such as that sold under the trademark "Melamine" or with an alkyd resin, but be rendered integral with the central core by means of an ethoxiline type resin such as that sold under the trademark "Araldite," or by means of melted sulphur, for example, and that the joint or filling between tube 5 and envelope 3 be made by means of a substance such as an Araldite resin, melted sulphur, an insulating compound or a silicone fat. It is also advantageous to impregnate the porous tube with melted sulphur and to make the joint between said porous tube and the central core also melted sulphur, in order that the protection afforded to the core be formed throughout of purely mineral substances.

By way of a variant, one may also fill the clearance between core 1 and porous ceramic tube 5 and/or between the latter and the envelope with a previously prepared insulating mass obtained by introducing, into an initially fluid and more or less viscous carrying medium, a pulverulent charge together with a certain proportion of mica powder.

It is well known that heat-hardenable resins can be charged in the liquid state and then polymerized, or that fusible mineral substances like sulphur can be melted and charged in the fluid state with powdered graphite, slate, etc., or else with sand, and then solidified. This makes it possible to charge the fluid substance with powder having a much higher density than the substance itself, but there is then a danger that the charge may become variously graded if the hardening operation is protracted, and this will be all the more likely when the charge percentage is small.

Now I have found that if a certain proportion of mica powder be introduced together with the charging powder, greatly improved homogeneity is obtained in the distribution of the charge. This can presumably be attributed to the fact that, by virtue of their shape, the mica flakes become stabilized in the fluid mass and retain the more compact power grains.

Recourse has already been had in electrical engineering to resin-bonded micas, and the principle of forming mouldable substances from sulphur and mica has also been taught. The insulating substance herein considered, however, differs in that the mica does not form the essential constituent of the charge but is added to another charge, so that there are always at least three constituents, to wit the charged material, the charge itself and the mica.

For example, if there be introduced into a mass consisting of Araldite D and plastic Thiokol LP3 a charge of Nemours sand of a grade retained by sieve sizes 40 to 70 in order to obtain the following proportions:

|  | Percent |
|---|---|
| Araldite D | 40 |
| Thiokol LP3 | 20 |
| Nemours sand (sieve size 40 to 70) | 40 | rapid sedimentation of the sand will be observed, and this will be all the more rapid as the percentage of sand becomes smaller. On the other hand, if there be introduced into that same mass a certain proportion of mica, a perfectly stable suspension will be obtained if the proportions adopted, notwithstanding the fact that they are more unfavorable, are as follows:

|  | Percent |
|---|---|
| Araldite D | 50 |
| Thiokol LP3 | 15 |
| Mica 50 to 150 | 15 |
| Nemours sand (sieve size 40 to 70) | 20 |

This example is by no means a limiting one.

As stated previously, such masses can be used to fill the clearance between core 1 and tube 5 and/or between tube 5 and envelope 3.

Regardless of the embodiment adopted, it will easily be appreciated that after the envelope 3 of the insulator in accordance with the invention is destroyed, as the result say of a transmission line mishap which has caused arcing over the insulator, tube 5 will afford limited protection to the core for a limited time against any fresh serious mishap, and will enable it to operate normally, by reason, in particular, of the well-known resistance of the aforementioned resins to the effects of leakage currents and of the equally well-known insulating qualities of sulphur.

The filling of the annular space between the core and the envelope by a porous ceramic tube offers the added advantage that the coefficient of expansion of the medium used thus to fill said space is determined by the coefficient of expansion of the porous ceramic tube itself and is consequently of the same order as that of the ceramic envelope. This overcomes the serious drawback arising from the use, as filler media, of organic insulating substances whose coefficients of expansion are very much greater than that of the envelope.

In the variant represented by the embodiment in FIG. 2, the insulator comprises the same basic component parts as that of FIG. 1, and these parts are designated by the same reference numerals. In this case, however, the core 1 is provided before assembly with a layer 10 formed from an oxide or mixture of oxides of high radiant heat reflectance in comparison with the core and porous ceramic, such as $Al_2O_3$, $MgO$, $ZrO_2$, $CeO_2$, deposited by melting and spraying in accordance with conventional metal projection techniques. The insulator is completed by filling the annular space between the treated core 1 and envelope 3 with the insulating materials referred to hereinbefore.

When an insulator so formed sustains arcing after envelope 3 has been destroyed, the highly refractory layer of oxide deposit strongly reflects the energy radiated by the arc and thus protects the core against the effects of heat. Such a reflecting layer can likewise be deposited on tube 5.

In the variant represented by the embodiment in FIG. 3, the insulator comprises a core 1 made of sulphur-bonded glass fibre, and this core is sealed to two metal caps 2 and housed in an insulating ceramic envelope 3, the space between the core and the envelope being filled with a mass 6 of sulphur which may be charged or not.

To improve contact between the sulphur mass 6 and the ceramic envelope 3, the inner face of said envelope may be spread with a silicone layer 7 or with a layer of some resin such as Araldite, to which sulphur adheres particularly well.

Here again it will be appreciated that after envelope 3 has been destroyed as the result of a line mishap, the insulator remains capable of continuing to ensure not only the suspension but also the insulation of the transmission line via the insulating core 1 covered with the mineral coating 6. When an arc of limited intensity is produced, a certain quantity of the sulphur in this layer can be melted and volatilized without producing a carbonization that would generate an electrical path, as would be the case were the core 1 to be coated with an organic insulating substance.

It is to be clearly understood that the various embodiments disclosed hereinabove are not to be taken in any limiting sense and that the scope of the invention covers all types of insulating material used for filling, for joining or for impregnating, regardless of whether such materials are unique or multiple in a given insulator and regardless of the shape of the fittings, the core and the envelope.

What is claimed is:

1. A line suspension insulator comprising a central insulating bar-shaped core resistant to mechanical traction forces, two attachment fittings respectively connected to each end of said core, an insulating protective envelope made of ceramic capable of withstanding electric arcing surrounding but spaced from said core to define an annular space between said core and said envelope, said envelope extending substantially the full distance between said fittings and being secured thereto, a porous ceramic tube disposed in said annular space and extending between said fittings, and insulating media impregnating said porous tube and filling any remaining portions of said annular space.

2. An insulator as defined in claim 1 wherein said insulating media comprise an insulating impregnating medium impregnating said porous tube, a first insulating adhesive filler medium uniting said porous tube with said core and a second insulating adhesive filler medium uniting said porous tube with said envelope.

3. An insulator as defined in claim 2 wherein said impregnating medium is an insulating substance selected from the group consisting of the alkyd resins, polyamide resins, and sulphur.

4. An insulator as defined in claim 3, wherein at least one of the first and second filler media is an insulating adhesive substance selected from the group consisting of ethoxilene resins, silicone fats, and sulphur.

5. An insulator as defined in claim 2, wherein the impregnating medium and the first filler medium are sulphur.

6. An insulator as defined in claim 2, wherein at least one of the first and second filler media is an insulating mass comprising a major amount of a heat hardenable resin, a minor amount of mica powder, and a second insulating mineral in powder form.

7. An insulator as defined in claim 6, wherein said hardenable resin is present in an amount up to about 65% and said mica powder is present in an amount of about 15%.

8. An insulator as defined in claim 2, wherein at least one of the first and second filler media is an insulating mass comprising a major amount of sulphur, a minor amount of mica powder, and a third insulating mineral in powder form.

9. An insulator as defined in claim 1, wherein at least one of the core and porous ceramic tube is covered with a refractory layer of high radiant heat reflectance in comparison with the radiant heat reflectance of the core and porous ceramic tube.

10. An insulator as defined in claim 9, wherein said layer comprises at least one refractory oxide selected from the group consisting of alumina, magnesia, zirconia, and cerium oxide.

11. A line suspension insulator comprising a central insulating bar-shaped core resistant to mechanical traction forces, two attachment fittings respectively connected to each end of said core, an insulating protective envelope made of ceramic capable of withstanding electrical arcing surrounding but spaced from said core to define an annular space between said core and said envelope, said envelope extending substantially the full distance between said fittings and being secured thereto, a porous ceramic tube disposed in said annular space and extending between said fittings, said porous ceramic tube substantially filling said annular space and being impregnated with an insulating impregnating medium and united to said core and to said envelope to form an integral assembly.

References Cited in the file of this patent

UNITED STATES PATENTS

| 437,685 | Gaynor | Oct. 7, 1890 |
| 1,451,968 | Steinberger | Apr. 17, 1923 |
| 2,606,954 | Baker | Aug. 12, 1952 |
| 2,736,721 | Dexter | Feb. 28, 1956 |

FOREIGN PATENTS

| 160 | Great Britain | 1863 |
| 110,362 | Switzerland | June 1, 1925 |
| 127,627 | Switzerland | Sept. 1, 1928 |
| 71,989 | France | Oct. 5, 1959 |

OTHER REFERENCES

Publication: Moss, "'Araldite,' A New Adhesive, Coating and Casting Resin," British Plastics, November 1948, pages 521–527. Only page 523 relied on.